United States Patent [19]

Serracchioli et al.

[11] 3,772,656

[45] Nov. 13, 1973

[54] DATA COMMUNICATION SYSTEM BETWEEN A CENTRAL COMPUTER AND DATA TERMINALS

[75] Inventors: Francesco Serracchioli, Banchette; Umberto Steindler, Ivrea, both of Italy

[73] Assignee: Ing. C. Olivetti C., S.P.A., Turin, Italy

[22] Filed: Jan. 25, 1972

[21] Appl. No.: 220,656

[30] Foreign Application Priority Data

Feb. 1, 1971 Italy .............................. 67326 A/71
June 11, 1971 Italy .............................. 68986 A/71

[52] U.S. Cl. .............................................. 340/172.5
[51] Int. Cl. .............................................. G06f 3/00
[58] Field of Search .................................. 340/172.5

[56] References Cited

UNITED STATES PATENTS

| | | | |
|---|---|---|---|
| R26,832 | 3/1970 | Randlev | 340/172.5 |
| 3,396,372 | 8/1968 | Calvert | 340/172.5 |
| 3,653,001 | 3/1972 | Ninke | 340/172.5 |

*Primary Examiner*—Raulfe B. Zache
*Attorney*—William E. Schuyler, Jr. et al.

[57] ABSTRACT

A data communication system between a central computer and data terminals, in which a group of terminals is connected directly to the central computer and another group of terminals is connected to the central computer through a concentrator. The concentrator connects a terminal, which is ready to transmit, to the central computer in such a manner as to be transparent to the flow of the data.

14 Claims, 8 Drawing Figures

| | |
|---|---|
| X = 0 | U = A |
| X = 1 | U = B |

DATA COMMUNICATION SYSTEM BETWEEN A CENTRAL COMPUTER AND DATA TERMINALS

BACKGROUND OF THE INVENTION

1. Field of the Invention

The present invention relates to a communication system between a central computer and a series of data terminals capable of signalling individually that they are ready to transmit, at least one group of the terminals being connected to the central computer through a common transmission concentrator associated with a corresponding line controller, by means of which the computer controls a polling procedure for the despatch of data from the concentrator to the central computer.

2. Discussion of the Prior Art

Data transmission systems comprising a central computer and numerous terminal units, in which each terminal unit is connected to the central computer through a communication line of its own, are known. In this case each terminal unit has to be provided with a line controller and with a modem. In order to reduce the cost of such communication systems, it is known to provide intermediate units which acts as concentrators, to each of which there is connected a plurality of adjacent terminal units. Each concentrator is connected to the central computer through a communication line of its own. These intermediate units comprise buffer stores commonly called "buffers" which store the data in transmission for or from the terminals. The intermediate units require, furthermore, complicated logic for the control of the flow of the data. Consequently in this known system the central computer does not exchange the messages directly with the terminals, but with the intermediate units, wherefor these latter are not transparent to the exchange of data between the computer and terminal. The central computer differentiates between exchanges of data with a single directly connected terminal and exchanges via an intermediate unit, whereby the dialogue procedure is not uniform for all the terminals which exchange messages with the central computer.

SUMMARY OF THE INVENTION

The object of this invention is to overcome this disadvantage. In accordance with the invention, there is provided a system for the transmission of data between a central computer and a plurality of terminals capable of signalling individually a condition of ready to transmit, at least one group of the terminals being connected to the central computer through a common transmission concentrator associated with a corresponding line controller, by means of which the central computer controls a polling procedure for the despatch of data from the concentrator to the central computer, wherein the concentrator comprises common communication means between the terminals of the said group and the line controller, and connection means controlled by a terminal ready to transmit in order to connect the terminal with the communication means, whereby the computer communicates through the line controller directly with the terminal that is ready to transmit and the concentrator is transparent to the flow of data.

BRIEF DESCRIPTION OF THE DRAWING

The invention will become clear from the following description of two preferred embodiments, given by way of example, but not restrictively, with reference to the accompanying drawings, in which.

Figure 1:
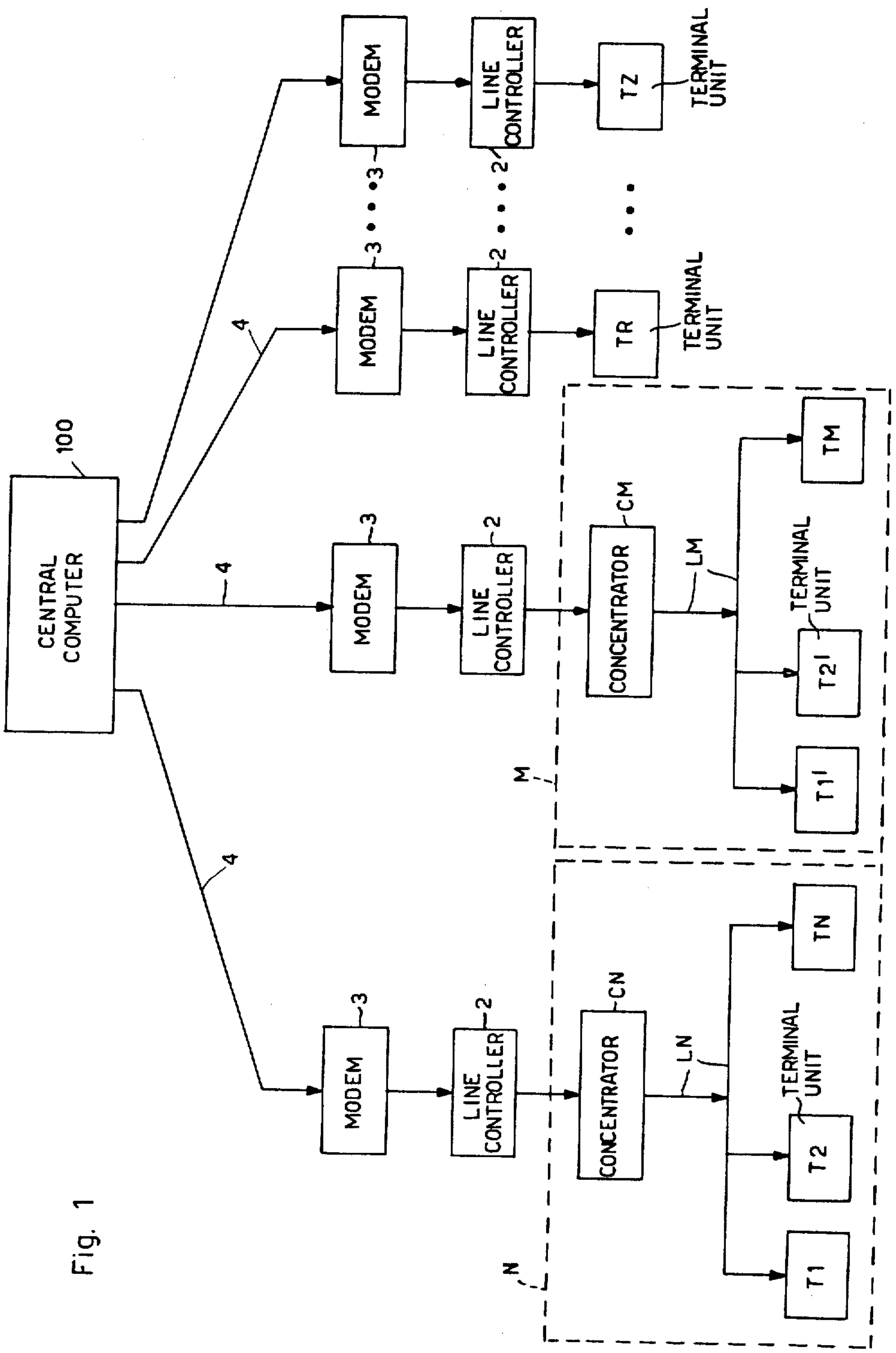
FIG. 1 is a block diagram of a communication system embodying the invention.

DETAILED DESCRIPTION OF THE PREFERRED EMBODIMENTS:

With reference to FIG. 1, the data communication system comprises a central computer 100, to which there are connected numerous terminal units of known type, indicated by a T followed by another letter or number. A first group N of N terminal units T1, T2, TN, situated for example in a single building and therefore relatively close together, is linked up to a single line LN. This latter is connected to an intermediate unit CN which acts as a concentrator. The concentrator CN is conneced through a line controller 2 of its own and a modem (modulator-demodulator) 3 of its own to the central computer 100, by means of a communication line 4. Similarly, another group M of M terminals T1, T2, TM is linked up through a line LM to a concentrator CM similar to the concentrator CN. The concentrator CM is connected through a line controller 2 of its own and a modem 3 of its own to the central computer 100, by means of another communication line 4. Other terminals TR . . . TZ, spaced apart, are on the contrary connected to the central computer 100 through a line controller 2 of their own, a modem 3 of their own and a communication line 4 of their own, in a manner identical to those of the concentrators CN and CM of the groups of terminals N and M. Each modem 3 can be of any known per se type. Each line controller 2 can, for example, be of the type described in the U.S. Pat. No. 3,564,5II.

The conversation procedures between the central computer 100 and the terminals T provide for the initiative of each exchange of data being left to the central computer 100, which controls both the despatch and the receipt of the messages. The messages are composed of characters, each of which is formed, for example, from eight bits, the eighth of which is a parity bit. In particular the following known conversation procedures are provided for:

"Simple polling" procedure in which the central computer 100 interrogates successively all the terminals for the despatch of the data from these to the computer 100;

"Selection" procedure in which the computer 100 selects one terminal for the despatch to it of a message from the computer 100;

"Addressed polling" procedure in which the computer 100 interrogates a particular terminal for the despatch of the data from this terminal to the computer 100.

The selection of a terminal takes place through its line controller 2. Each line controller 2 is identified by an address of its own which is emitted by the computer 100 and is constituted by one character. This character will be indicated hereinafter by IND 1, and is capable of being recognised only by the corresponding line controller 2, in a manner known per se. Through the line controllers of the individual terminals TR . . . TZ, such an address selects directly the terminal itself.

Within the limits of each group N, M of terminals connected to a single concentrator, CN, CM, the terminal T1 . . . TN, or T1' . . . TM, is identified by another address also emitted by the computer 100 and constituted by another character, which will be indicated by IND 2. In reality the character IND 2. constituted like the others of eight bits, comprises four bits *b*1, *b*2, *b*3 and *b*4 which constitute the address proper of a terminal forming part of the group connected to a concentrator, whereby the maximum number of terminals which can be connected to a concentrator cannot exceed sixteen. Two other bits *b*5 and b6 of the character IND 2 indicate the type of conversation procedure which the computer 100 intends to set up. In particular, if *b*6 = 0, the procedure is polling, but if *b*6 = 1 the procedure is selection. If *b*6 = 0 one can have *b*5 = 0 to indicate simple polling, whereby the first four bits of the character IND 2 do not have any significance. With *b*6 = 0 one can also have *b*5 = 1 to indicate that addressed polling is required, whilst with *b*6 = 1 one has always *b*5 = 1.

The address is thus represented by the character IND 1 if a single terminal is involved or by the first four bits of the character IND 2 if a terminal of a group M or N is involved. Therefore, in the event of there being selected an individual terminal TR . . . TZ, only the bits b5 and b6 of the character IND 2 are significant.

There will now be described in detail one concentrator CN, the concentrator CM being the same as CN. The concentrator CN (FIG. 2) comprises scanning means constituted by an addressing counter 10 capable of counting in binary from 0 to 15 in known manner in order to interrogate in sequence the terminals of the group N. The counter-addresser 10 is provided with a register 11 having four cells capable of staticizing an address of a terminal T1 . . . TN connected to the concentrator CN, by saticizing each bit in a corresponding cell. The counter-addresser 10 is capable of increasing by one the address registered in the register 11 whenever it receives from a terminal T1 . . . TN signal NP, which indicates that the terminal which has that address which is staticized in the register 11, is not ready to transmit messages. The concentrator CN comprises, furthermore, an electronic switch 14 connected through a channel 12 with the register 11. To the switch 14 there also leads a channel 15 which forms part of the reception line and emanates from the line controller 2, which conducts in parallel the first four bits *b*1, *b*2, *b*3 and b4 of each character emanating from the central computer 100 (FIG. 1).

Figure 2:
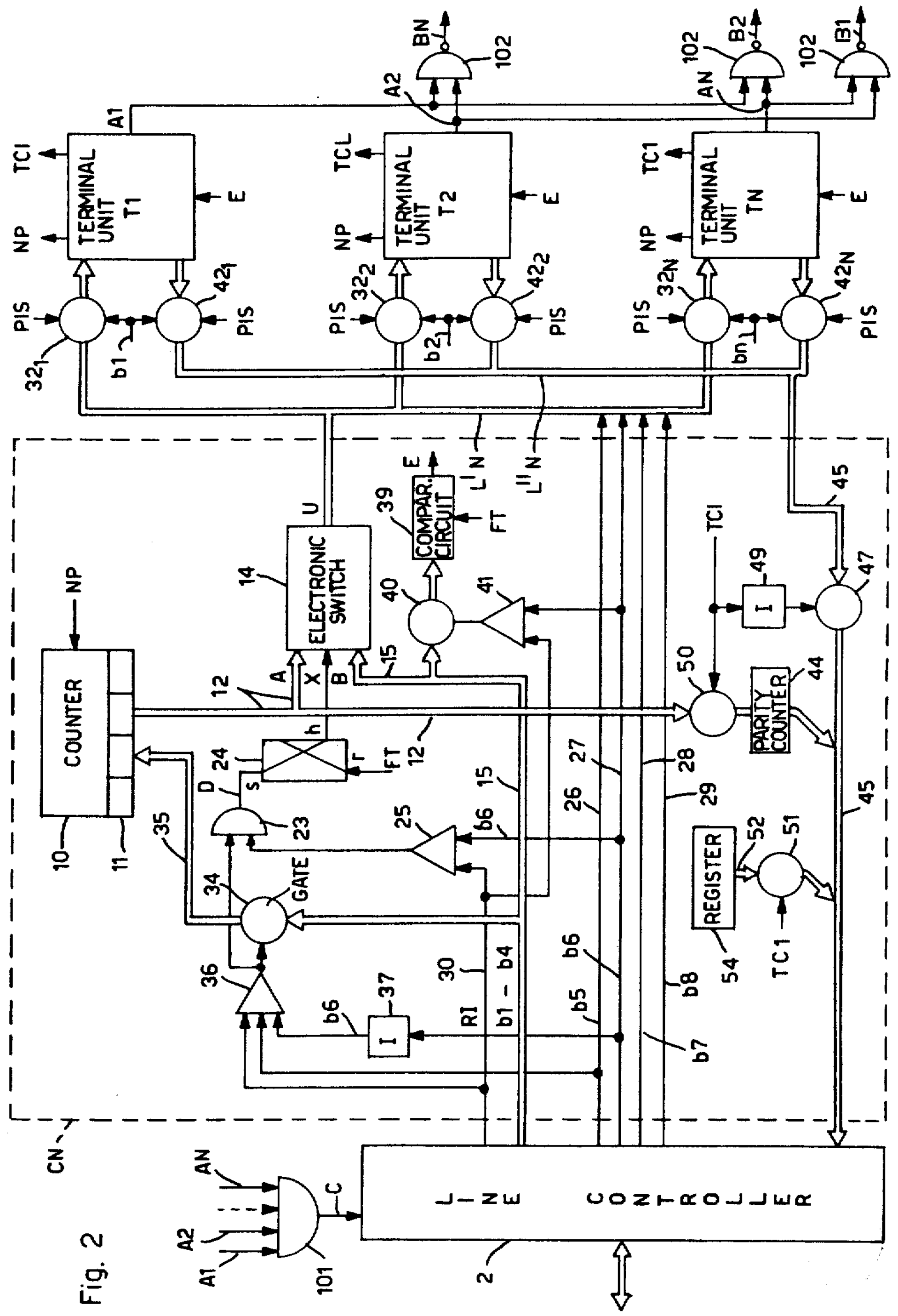
FIG. 2 shows a detailed diagram of a concentrator for a first embodiment of the system.
Figures 3, 3A:
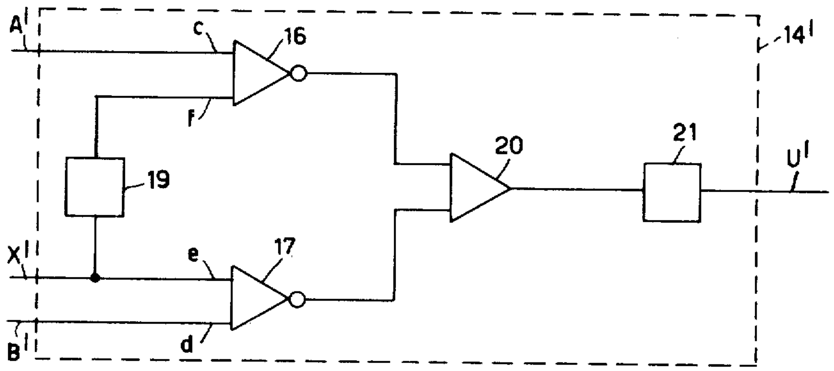
FIG. 3 shows the circuit of a detail of the concentrator of FIG. 2.
FIG. 3*a* is a truth table for the circuit of FIG. 3.

The electronic switch 14 is constituted by four elementrary switches 14', one of which is shown in detail in FIG. 3. Each element switch 14' is provided for a corresponding bit *b*1 – *b*4, and has the characteristic of presenting as its output U' a signal equal to an input signal A' or B', according to whether a switching signal X is 0 or 1. The switch 14' comprises two NAND circuits 16 and 17; at an input *c* of the NAND circuit 16 there arrives the signal A' and at an input *d* of the NAND circuit 17 there arrives the signal B'. The switching signal 14', common for all the four switches 14', is applied to a second input *e* of the NAND circuit 17 and, inverted by an inverter 19, is applied to a second input *f* of the NAND circuit 16. The outputs of the NAND circuits 16 and 17 are fed to an AND circuit 20. The output of the circuit 20 is inverted by the inverter 21. The output of this latter constitutes the output U' of the switch 14'. It is easy to check that this circuit satisfies the conditions illustrated in the truth table of FIG. 3*a*. In FIG. 2 the inputs A and B and the output U indicate channels for four bits A', B', and U' in parallel.

The register 11 is furthermore capable of being loaded by channel 35 with the bits *b*1, *b*2, *b*3 and *b*4 present in the channel 15 when a gate 34 is opened. This latter is opened when the output of an AND circuit 36 has the value 1. The circuit 36 has three inputs. A first input is connected to a wire 30, a second input is fed by the signal present on a wire 26, namely by the bit *b*5, and a third input is fed by the inverse of the bit *b*6 present on a wire 27 and inverted by an inverter circuit 37. The gate 34 is therefore opened when the bits *b*5 and *b*6 of the character IND 2 are 1 and respectively 0, namely in the case of "addressed polling," if a signal RI on the line 30 indicates in known manner that the line controller 2 has already recognised as its own the address IND 1 sent by the central computer 100 (FIG. 1). The signal RI (FIG. 2) lasts for the character period subsequent to the character IND 1.

The switching signal X for the switch 14 is applied by a bistable flip-flop 24 (FIG. 2), which provides at an output *h* a signal 1 if a signal D applied to one of its inputs *s* has the value 1. The signal D constitutes the logical OR effected by an OR circuit 23 between the outputs of the AND circuit 36 and of another AND circuit 25. The AND circuit 25 effects the logical AND between a bit *b*6 present on the wire 27 comprised in the transmission line and the signal RI present on the wire 30. The signal D is therefore equal to 1 if the bit *b*6 of the address IND 2 is 1, or else if the output of the circuit 36 is at the level 1, that is if the central computer wishes to set up the procedure of selection or of addressed polling. In its turn the flip-flop 24 is reset, that is the signal O presents itself to its output *h* when there is applied to its input "*r*" a signal FT indicative of the end of a message.

The four bits *b*1 – *b*4 which traverse the electronic switch 14 are sent to a line LN' which, together with a line LN'', constitutes the transmission line LN common to all the terminals T1 . . . TN of the group N.

At the line LN' there arrive, besides the wires 26 and 27, also other wires 28 and 29, comprised in the transmission line, which conduct the bits b7 and b8 of each character which emanates from the line controller 2. From the line LN', there branch a number of input channels equal to the number of terminals T1 . . . TN of the group N. In each of the said channels there is placed a gate $32_1$ . . . $32_N$ which is closed by a signal B1, B2 . . . BN relating to each terminal T1, T2 . . . TN, when the signal B1, B2 . . . BN assumes the value O. For this purpose each terminal is capable of emitting a corresponding signal A1, A2 . . . AN when, in consequence of a polling or selection request, it finds itself in the condition of "ready to transmit." A NOR circuit 102 is furthermore associated with each terminal of the group N.

Each signal B1 . . . BN is generated by the corresponding NOR circuit to whose inputs there are applied all the signals A1 . . . AN generated respectively by the terminals T1 . . . TN, except the signal relating to the terminal corresponding to the NOR circuit 102 in question. Thus to the NOR circuit 102 relating, for example, to the terminal T1 there are applied the signals A2, A3 . . . AN generated by the remaining terminals, so that the signal B1 has the value 1 when no other one of the terminals is ready to transmit.

Consequently the gate $32_1$ is opened only when none of the other terminals has accepted a selection or a polling, whereas, if one of the other terminals has accepted the dialogue with the central computer 100 (FIG. 1), the gate $32_1$ (FIG. 2) is closed. All the gates 32 are opened also by a signal PIS which indicates the arrival from the line controller 2 of a request for "selection" or for "addressed polling."

A comparison circuit 39 comprises a register having four stages which is capable of being loaded by the four bits present in the channel 15 when a gate 40 is opened by the output of an AND circuit 41 having the level 1. The AND circuit 41 has two inputs: a first input is connected to the wire 27 and the second input to the wire 30. The gate 40 is therefore opened on the occasion of a "selection" procedure. If there is forced into the comparison circuit 39 a configuration different from that already registered, it emits a signal E which disables, in known manner, each terminal T1 . . . TN. The circuit 39 is zeroed by the end-of-message signal FT.

The terminals T1 . . . TN are each connected to another line LN'' through corresponding gates $42_1$ . . . $42_N$ similar to the gates $32_1$ . . . $32_N$ and also closed by the signals B1 . . BN. The line LN'' is connected to a reception channel 45 common to all the terminals T1 . . . TN and capable of being traversed by seven bits in parallel. The channel 45 is connected to the line controller 2.

In the channel 45 there is inserted a gate 47 which is closed by a signal TC1 which is emitted by the terminal T1 . . . TN which sends a message to the central computer 100 (FIG. 1), when the first character of the message is transmitted. The signal TC1 (FIG. 2) is inverted by the inverter 49 and its negate closes the gate 47. The same signal TC1 opens a gate 50 placed on a connection channel 51 between the channel 12 and the channel 45. A parity counter 44 inserted into the channel 12 is capable of controlling the parity of the bits of each character which traverses the channel 45 and of supplying a further bit which has the value 1 if the number of the bits of the character of value 1 is odd. Finally, the signal TC1 opens a gate 51 connected to the channel 45 by means of a connection channel 52 with a register 54 which supplies to the channel 52 a fixed configuration of three bits, which is added to the five bits emanating from the channel 12 in order to complete the character to be transmitted to the line controller 2.

Figure 4:
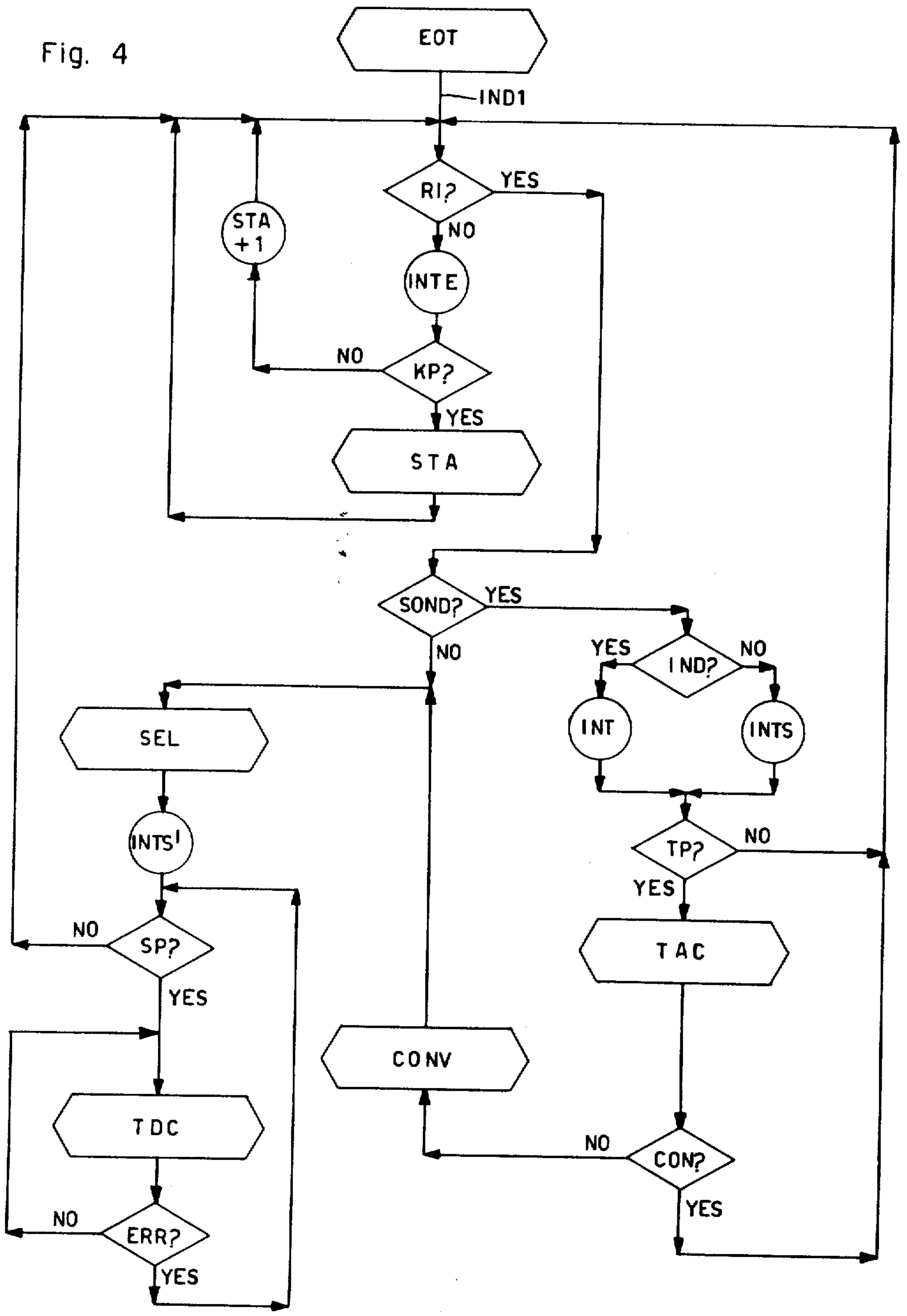
FIG. 4 shows the flow diagram of the conversation procedure of the system of FIG. 1.

The operation of the transmission system is described with reference to the flow diagram of FIG. 4, which gives a representation of the conversation procedure between the central computer 100 (FIG. 1) and a terminal of the group T1 . . . TN, which conversation is set up through the concentrator CN. In FIG. 4 the hexagons indicate the states in which the concentrator CN finds itself, the rhombuses the logical choices and the circles the operations completed by the concentrator CN. The decisions on logical choices are indicated as YES and NO.

The exchange of data between the central computer 100 and, for example, the terminals T1 . . . TN connected through the concentrator CN takes place in the following manner. The central computer 100 (FIG. 1) makes a conversation request by sending a character EOT which puts into the waiting condition both the line controllers 2 connected directly to the individual terminals TR, TZ and those connected to a concentrator CN, CM. The line controllers 2 were previously in a condition of rest. Immediately after the character EOT there is transmitted (FIG. 4) the character IND 1 which brings the controllers 2 to the logical choice RI.

The waiting condition in a line controller 2 lasts for a predetermined period of time. Each line controller 2 which, within such a period, does not recognise as its own the address IND 1, returns into the condition of rest. The computer 100 then sends the character IND 2. If the character IND 1 indicated the line controller of a directly connected terminal TR, TZ, the procedure is set up in accordance with the value of the sixth bit *b6*, in known manner.

Let it be supposed at first that the line controller 2 (FIG. 2) of the concentrator CN had not recognised as its own the address IND 1. In this case the address recognition signal RI of the controller 2 is not present on the wire 30 (FIG. 2). The absence of RI places the output signal D of the "OR" circuit 23 to level O. The concentrator CN is thus put into the condition of interrogation indicated by INTE in FIG. 4. The signal D, applied to the input *s* of the flip-flop 24 (FIG. 2), sets the output signal X to level 0, whereby, as can be seen, the electronic switch 14 presents to the output U the same signal which is present at the input A. To this latter there are applied the bits of the address *b1* to *b4* staticized in the register 11, which is filled by the counter addresser 10. Let it be supposed that, at the beginning, the register 11 contains the address 0000. The bits present at the output U of the switch 14 are sent to the line LN' and hence to all the terminals T1 . . . TN. All the gates $32_1$ . . . $32_N$ are therefore opened, because all the signals B1 . . . BN are at the level 1, since no terminal T1 . . . Tn has sent "ready to transmit" signal A1 . . . AN.

The terminal T1 which has the address 0000, having recognised its address, can declare itself not ready to transmit by emitting the signal NP; the corresponding condition is indicated in FIG. 4 by the logical choice KP. In the case of the terminal being ready to transmit the counter addresser 10 (FIG. 2) does not increase the address staticized in the register 11, given the lack of the signal NP. The content of the register 11 therefore remains the same whilst the relative condition of staticization is indicated by STA in FIG. 4. Furthermore, the signal A1 generates the signals B2 . . . BN which close all the gates $32_2$ . . . $32_N$ and $42_2$ . . . $42_N$ of all the terminals, except the gates $32_1$ and $42_1$ which put it into communication with the line LN.

In the case of not being ready, the counter addresser 10, under the control of the signal NP, increases by one unit the address staticized in the register 11, this operation being indicated in FIG. 4 by STA + 1. All the gates 32 and 42 then remain opened. There is interrogated, therefore, the terminal having address 0001 with the same procedure as described. The scanning process continues until a terminal indicates that it is ready to transmit a message.

In the event of a terminal T1 . . . TN declaring itself ready to transmit, its address remains staticized in the register 11, and there remain open only the gates $32_1$ . . . $32_N$ and $42_1$ . . . $42_N$ which put the line LN in communication with such a terminal as in the case seen for the terminal T1. Furthermore, the logical sum of all the signals A1 . . . AN forms a signal C generated by an OR circuit 101. The signal C advises the line controller 2 that one of the terminals T1 . . . TN has a message to be transmitted. The situation remains such until when the line controller 2 does not recognise as its own the address IND 1 sent by the central computer 100 (FIG. 1). The line controller 2, when it recognises the address IND 1, allows in known manner the passage of the successive characters on the channel 15 (FIG. 2) and on the wires 26, 27, 28 and 29. The concentrator CN, through the wires 26 and 27, controls also the type of conversation requested by the central computer 100 (FIG. 1). This condition is indicated by the choice SOND in FIG. 4 and then by the choice IND between simple polling and addressed polling. If $b6 = 0$ we have SOND = yes, i.e., the procedure is polling, but if $b6 = 1$ the procedure is selection.

If the central computer 100 (FIG. 1) has requested a simple polling, the bits $b5$ and $b6$ of the character IND 2 are at the level 0, whereby the gate 34 is closed, $b5$ being $= 0$, and the circuit 25 emits a signal $D = 0$ since $b6 = 0$. Therefore the level of the signal X is O. There is thus interrogated that terminal which has as address the last one staticized in the register 11 which is transmitted through the channel 12 (operation INTS in FIG. 4). The terminal interrogated receives also the bits $b5$ and $b6$ through the wires 25, 26 (FIG. 2) and the line LN'. The terminal therefore enters the condition indicated by the logical choice TP (FIG. 4).

If the terminal interrogated is not ready to transmit, it sends a not-ready signal NP to the line controller 2, through the lines 45 and 46 (FIG. 2). This then responds in known manner to inform the computer 100 (FIG. 1) that it does not have a message to be transmitted. If, on the contrary, the terminal interrogated is ready to transmit, it sends first a transmission commencement signal TC 1 (FIG. 2). Such a signal closes the gate 47 and opens the gate 50, whereby there are sent on the channel 45 the four bits $b1$ . . . $b4$ of the address of the terminal, staticized in the register 11 plus the parity bit introduced by the circuit 44. The signal TC 1 furthermore opens the gate 51 which allows the first character sent to be completed, by adding to the aforesaid five bits the three bits $b5$ . . . $b7$ of the fixed configuration, held by the register 54. There now starts the transmission of the message of the terminal interrogated to the computer 100 and the relative condition is represented by the condition TAC in FIG. 4.

Let it now be considered that the computer 100 (FIG. 1) sends an "addressed polling" for a given terminal of the group N, controlled by the concentrator CN (operation INT in FIG. 4). In this case too the second address IND 2 is transmitted by the line controller 2 (FIG. 2) to the concentrator CN, either if a terminal T1 . . . TN has declared first that it is ready to transmit, or if in counter addresser 10 is engaged in the scanning phase.

The four bits $b1$ to $b4$ of the character IND 2 which constitute the address of the terminal requested, pass through the channel 15. The bits $b5$ and $b6$ have, as has been seen, the value of 1 and respectively 0. In combination with the signal RI and through the circuit 36 they open the gate 34 which allows the registration of the address of the terminal indicated by the character IND 2 in the register 11, replacing the address which may be staticized in it because of the preceding scanning. Furthermore, the output of the circuit 36 arrives at the OR circuit 23, whereby the signal D is at the level 1. Consequently, the electronic switch 14 finds itself in the condition whereby at the output U there are the same signals present at the input B. The electronic switch 14 then allows the address of the register 11 to arrive at the line LN'. The gates 32 and 42 are opened by the signal PIS which indicates that there has been requested an "addressed polling" or a "selection." From this moment the exchange of the data takes place as in the case of "simple polling." Both in the case of "simple polling" and in the case of "addressed polling," if at the end of the transmission the computer 100 has a reply message, indicated in FIG. 4 by the logical choice CON, it sends it immediately, carrying out thus the "conversation" procedure indicated in FIG. 4 by the condition CONV. The message is sent in a manner completely similar to that used in the "selection" procedure, which will be explained hereinafter. If, on the contrary, at the end of the transmission, the conversation procedure is not set up, the concentrator returns into the initial condition.

Finally, let it be supposed that the computer wishes to set up the "selection" procedure for the despatch of a message to a given terminal controlled by the concentrator CN. The concentrator then enters the condition SEL of FIG. 4. In this case, too, the character IND 2 is transmitted by the line controller 2 (FIG. 2) to the concentrator CN (operation INTS' in FIG. 4). The four bits $b1$ to $b4$ of the character IND 2 which indicate the address of the terminal to be selected pass also then through the channel 15 (FIG. 2). The bits $b5$ and $b6$ both have the value 1, whereby the bit $b6$ through the inverter 37 and the circuit 36 closes the gate 34 whereby the channel 15 no longer communicates with the channel 35 and the register 11 is excluded from the flow of the data and there remains staticized in it the address reached with the scanning of the counter 10. Furthermore, the same bit $b6$ in combination with the signal RI and through the circuit 41 opens the gate 40, staticizing in the register 39 the four bits present on the channel 15. Finally, the bit $b6$ in combination with the signal RI causes the circuit 25 to generate a signal 1 whereby also the signal D is at the level 1. The signal D acts on the flip-flop 24 in such a way that at its output there is generated a signal $X = 1$. Therefore, the switch 14 is switched into its second condition in which it presents in output U the same signals present at the input B.

The gate 40 remains opened only for the character period which follows the address IND 1, that is when four bits of the character IND 2 are present on the channel 15. In fact, after the character IND 2, the signal RI ceases, whereby the AND circuit 41 causes the gate 40 to close.

Given the condition of the switch 14 there now arrive at the line LN' four bits which form the address of the terminal to be selected through the channel 15 and the switch 14 itself. Since all the gates $32_1$ . . . $32_N$ and $42_1$ . . . $42_N$ are opened by the signal PIS, the terminal to be selected recognises in known manner its address, and is thereby selected. The terminal selected responds directly to the computer 100 through the channel LN'' and 46, whereby the concentrator CN is transparent to the communication. Through the channels LN'', 45 and 46 the terminal now replies whether it does not accept or accepts the "selection," as indicated by the logical choice SP.

In the first case the central computer 100 (FIG. 1) proceeds in its work programme and the concentrator CN returns into its initial condition. In the second case the computer 100 sends the text of the message through which there takes place the condition of despatch of the text of the computer indicated by TDC in FIG. 4. This message is preceded for the purpose of verification by a new despatch of the characters IND 1 and IND 2, preceded by a start-of-message signal STX. The two address characters indicate again the concentrator CN and the terminal selected. The four bits of the character IND 2 of the address of the selected terminal now arrive at the terminal itself through the channel 15 and the lines LN', the switch 14 being in the selection condition previously indicated.

The bit *b6* and the signal RI through the circuit 41 reopen once more the gate 40, whereby the four bits, present on the channel 15, are again forced into the register 39, whereby the concentrator moves into the logical choice ERR (FIG. 4). If these bits are the same as those previously registered, the register 39 (FIG. 2) does not emit the signal E, whereby the condition TDC remains (FIG. 4). If, on the contrary, the four bits are different, the register 39 (FIG. 2) emits a signal E which indicates that there has been an error, in this way disabling all the terminals T1 . . . TN from receiving messages, whereby the system returns to the logical choice SP (FIG. 4), whether there is an error or not.

In both cases, however, the characters of the text following the character IND 2 pass from the line controller 2 to the line LN through the channel 15 and the wires 26, 27, 28 and 29. The characters a arrive at the selected terminal which stores them. If the signal E is present, the characters are immediately cancelled.

The final character of the text, as has already been said, is an end-of-text character FT which resets the register 39 and the flip-flop 24. The switch 14 has remained switched in the condition in which U = B until the signal FT applied to the input *r* of the flip-flop 34 brings it back into the previous condition. The character FT thus causes the line controller 2 to return into the condition of rest.

The system operates in a similar manner in the event of the characters IND 1 and IND 2 containing the address of the concentrator CM (FIG. 1), and of a terminal of the group M.

From what has been seen above it becomes evident that in such a communication system the concentrators CN and CM allow there to be saved a large number of line controllers 2, and modems 3 and communication lines. Furthermore, the terminals do not undergo any modification through the fact of being connected to the line controller 2 through the concentrator. It furthermore becomes clear that, for example, the concentrator CN comprises common communication means LN between the terminals T1 . . . TN of the group N and of the controller 2 and means $\mathbf{31_1}$ . . . $\mathbf{32_N}$ and $\mathbf{42_1}$ . . . $\mathbf{42_N}$ controlled by a terminal ready to transmit in order to connect it to the communication means LN, whereby the computer 100 communicates through the controller 2 directly with the terminal ready to transmit and the concentrator CN is transparent to the flow of data.

In accordance with a second embodiment of the invention, each concentrator CN, CM can be connected to the corresponding group of terminals $T_1$ . . . $T_N$, so that the data is exchanged in serial manner instead of in parallel, with the aim of using for the transmission of the data a single pair of conductors.

Figure 5:
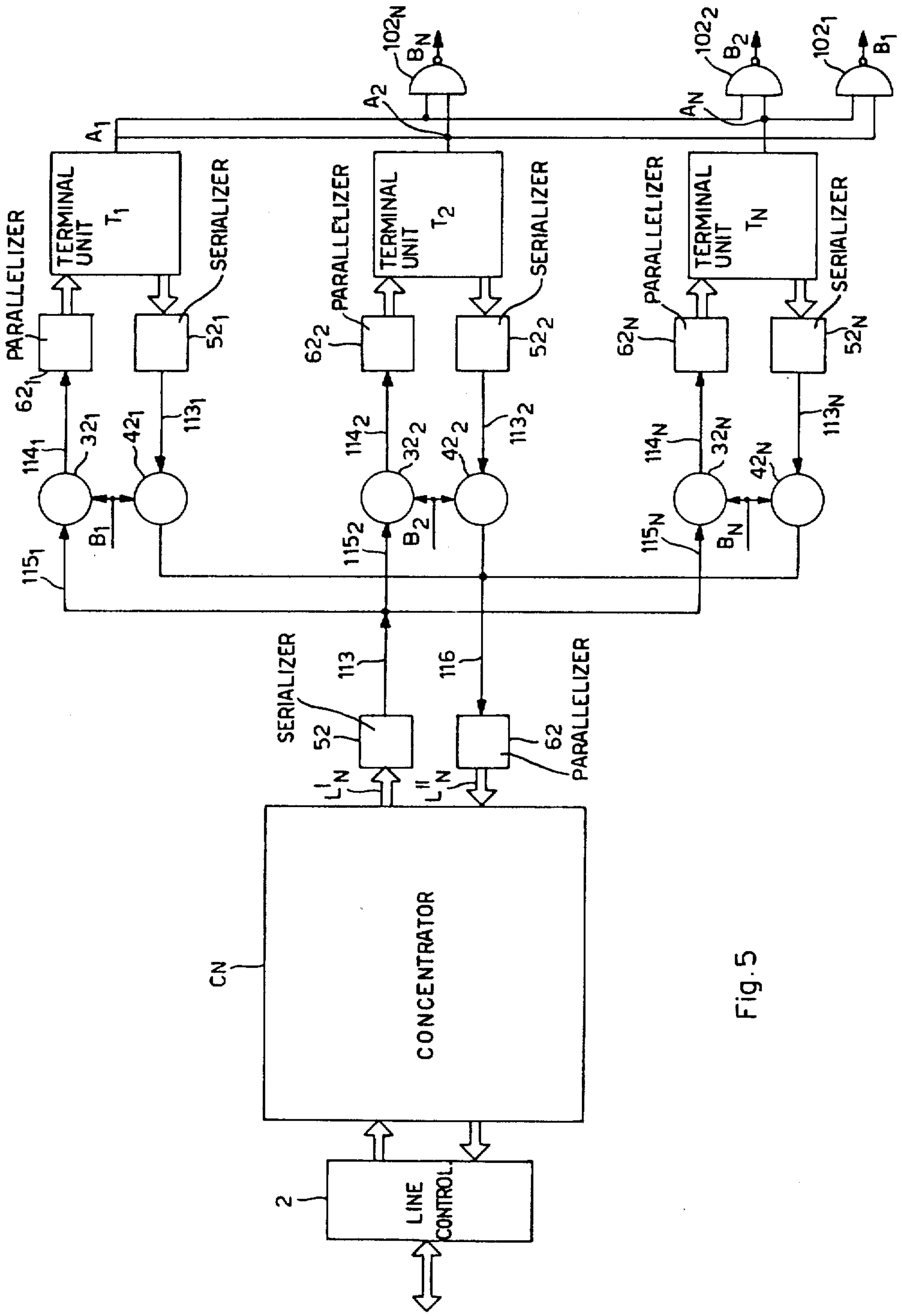
FIG. 5 is a block diagram of part of another system embodying the invention.
Figure 6:
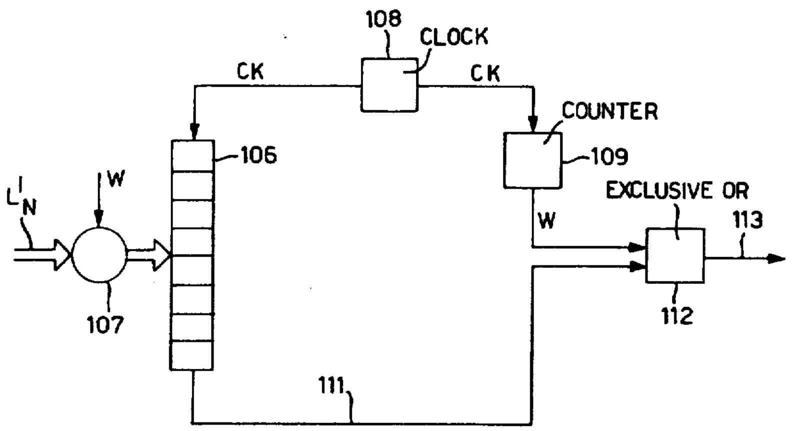
FIG. 6 shows a circuit in the system of FIG. 5.

To this end, the output channel L'N of the concentrator CN (FIG. 5) can be connected to the input of a serializer circuit 52, from whose output 113 there branches off a number of conductors $\mathbf{115_1}$ . . . $\mathbf{115_N}$, each associated with one of the terminals T1 . . . TN. Each conductor $\mathbf{115_1}$ . . . $\mathbf{115_N}$ is connected through the gate circuits $\mathbf{32_1}$ . . . $\mathbf{32_N}$ to a corresponding parallelizing circuit $\mathbf{61_1}$ . . . $\mathbf{62_N}$. These latter are connected to the terminals T1 . . . TN in order to allow the transmission of the data from the computer to the selected terminal.

Similarly, the input channel L''N of the concentrator CN connects the terminals T1 . . . TN to the concentrator CN through another parallelizer circuit 62 similar to the circuits $\mathbf{62_1}$ . . . $\mathbf{62_N}$, and a plurality of serializer circuits $\mathbf{52_1}$ . . . $\mathbf{52_N}$, for the transmission of the data from the terminals to the computer.

Each circuit 52, $\mathbf{52_1}$ . . . $\mathbf{52_N}$ (FIG. 2) comprises a shift register having eight positions 106 at whose inputs there are present the eight bits of the character transmitted by the concentrator on the line L'N through the gate circuit 107. The shifting of the bits along the positions of the register 106 is effected by a signal CK generated by a clock 108. This actuates furthermore a counter 109 capable of generating on its output a singal W at each counting cycle, the signal W going to the level *1'' when the counter has counted eight signals CK.

The output 111 of the shift register 106 and the output of the counter 109 constitute the inputs of an "exclusive or" circuit 112 known per se, which presents at the output 113 a data signal only if the signal W is at the level 0.

If a character is present on the line L'N, it is transferred into the shift register 106, when the signal W is at the level 1, that is at the commencement of the counting cycle of the counter 109. Immediately after, the signal W goes to the level 0, whereby the subsequent character cannot be introduced into the register 106, the gate circuit 107 being closed.

At the same time the clock 108 brings about the shifting of the bits contained in the register 106, which are therefore transmitted serially to the output 111. Since the signal W is at the level 0 the "exclusive or" circuit 112 is opened and therefore the bits can be transmitted through the output 113 and hence to the selected terminal.

Figure 7:
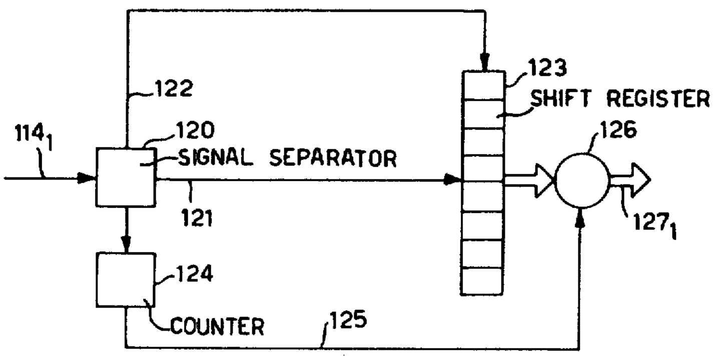
FIG. 7 shows another circuit in the system of FIG. 5.

The bits transmitted in this way, passing through one of the gates $\mathbf{32_1}$ . . . $\mathbf{32_N}$ (FIG. 5) selected in the manner seen previously, arrive at one of the parallelizer circuits $\mathbf{62_1}$ . . . $\mathbf{62_N}$, for example the circuit $\mathbf{62_1}$. Such circuits each comprise an input $\mathbf{114_1}$ . . . $\mathbf{114_N}$, on which there are present the bits transmitted serially by the concentrator 101 through the serializer 52. Such bits enter into a signal-separating circuit 120 (FIG. 7) capable of supplying in known manner on an output 121 the received bits and on another output 122 timing signals in synchronism with the transmission frequency of the bits. The bits are introduced through the output 121 into a shift register 123. The frequency with which such bits are shifted is supplied by the output 121 and is therefore the same with which the bits arrive on the conductor $\mathbf{114_1}$.

At the same time the separator 120 actuates a counter 124 having eight states, the output 125 of which is at the level 1 only when the counter has counted eight bits, namely when the shift register 123 has been filled up with the eight bits of the character emanating from the conductor $\mathbf{114_1}$. The output 125 of the counter 124 opens in its turn a gate circuit 126, whereby the bits are transmitted in parallel into the channel 127 and hence to the terminal T1. In this way each character transmitted in parallel by the concentrator 101 on the channel L'N is serialized by the circuit 52, transmitted on the conductor 113, and then parallelized by the circuit $\mathbf{62_1} \ldots \mathbf{62_N}$.

Similarly, when a character is transmitted by a terminal T1 . . . TN to the concentrator 101, it is serialized by the corresponding circuit $\mathbf{52_1} \ldots \mathbf{52_N}$, and through a reception conductor 116 is then parallelized by the circuit 62. In this way the transmission conductor 113 and the reception conductor 116 can be constituted by a single pair of conductors, whereby the connecting between the terminals and the concentrator takes place in a manner which is economical and not very cumbersome.

It is understood that various other modifications can be within the scope of the invention. For example, in order to characterize the type of conversation the bits *b*5 and *b*6 can assume different combinations of values from those given. In such a case it is sufficient to introduce suitable inverters into the circuit shown in FIG. 2. Furthermore, for the purpose of reducing the communication lines in the event of concentrators and individual terminals finding themselves close together, thanks to the transparency of the concentrators CN, CM to the flow of data, it is possible to connect to a single line four or more concentrators, or else at least one concentrator and at least one individual terminal, each through a line controller 2 of its own and a modem 3 of its own.

What we claim is:

1. A system for the transmission of data between a central computer and at least one group of terminals connected to the central computer through a common transmission concentrator and a corresponding line controller, said concentrator and said line controller being operable by the central computer to control a polling procedure for the dispatch of data from the concentrator to the central computer, wherein the improvement comprises:

common communication means included in said concentrator for the communication of data between the terminals and the line controller, and connecting means controlled by a terminal of said group ready to transmit for connecting the terminal with the communication means, whereby the computer communicates through the line controller directly with the terminal ready to transmit and the concentrator is transparent to the flow of data.

2. A system according to claim 1, wherein the concentrator comprises scanning means for interrogating in sequence the terminals of said group and for selecting a terminal ready to transmit, a counter addresser comprised in the scanning means and adapted to send in sequence a series of progressive numbers indicative of the address of each of the terminals of said group, the counter being incremented by a signal generated by any interrogated terminal of the group which is not ready to transmit.

3. A system according to claim 2, further comprising stopping means responsive to the absence of said incrementing signal to stop said counter in correspondence with the terminal of said group ready to transmit, and starting means responsive to an end-of-message character generated by a terminal which has finished transmitting to start said scanning means to scan the other terminals of said group.

4. A system for the transmission of data between a central computer and at least one group of terminals connected to the central computer through a common transmission concentrator and a corresponding line controller, said concentrator and said line controller being operable by the central computer to control a selection procedure for the dispatch of data from the computer to a particular terminal, wherein the improvement comprises:

common communication means included in said concentrator for the communication of data between the terminals of said group and the line controller, connecting means controlled by a terminal of said group ready to transmit for connecting the terminal with the communication means, scanning means normally operative to scan in sequence the terminals of said group, and switching means included in said concentrator and caused by said computer to render inoperative said scanning means during said selection procedure and to operate in turn said computer to dispatch the address of the particular selected terminal to the common communication means, whereby the particular selected terminal is connected to said computer for receiving said data.

5. A system according to claim 4, wherein the scanning means comprise a counter addresser adapted to send in sequence a series of progressive numbers indicative of the address of each of the terminals of the said group, the counter being incremented by a signal generated by any interrogated terminal of the group, which is not ready to transmit.

6. A system according to claim 5,wherein the line controller generates a request signal and the address of the selected terminal, said switching means comprising an electronic circuit controlled by both said request signal and said address for connecting said terminal to the central computer and for inhibiting the progressive number output of the counter addresser.

7. A system according to claim 6, wherein the communication means comprise a reception line and a transmission line, the terminals of said group being connected in parallel to each of said lines, and comprising gate means connecting said lines to one terminal at a time, and control means conditioned by the said switching means for controlling said reception line and means controlled by predetermined bits of data transmitted by said central computer on the reception line for causing said controller to generate said request signal.

8. A system according to claim 7, wherein said predetermined bits in a particular configuration indicate a condition representative of a conversation procedure of addressed polling for the interrogation on the part of the computer of a particular terminal of the group, also comprising forcing means to force into the counter addresser the address of said particular terminal, whereby the address of said particular terminal is dispatched ahead of a reply message from said particular terminal.

9. A system according to claim 7, wherein the transmission line is further connected with auxiliary transmitting means for forcing into said line signals corresponding to the address transmitted by the counter addresser at the beginning of the transmission.

10. A data communication system between a central computer and a plurality of terminals, wherein some terminals of the said plurality are grouped into different groups, each of said groups of terminals being connected to the central computer through a transmission concentrator and a corresponding line controller, other terminals of said plurality being connected to the central computer through a corresponding terminal line controller like to each line controller connected to each concentrators.

11. A system according to claim 10, further comprising common communication means included in each of said concentrators for the communication of data between the terminals of the corresponding group and the line controller, and connecting means controlled by a terminal of said groups ready to transmit for connecting the terminal with the communication means, whereby the computer communicates through the corresponding line controller with the terminal ready to transmit and the concentrator is transparent to the flow of data.

12. A system according to claim 11, further comprising scanning means included in each of said concentrators and normally operative to scan in sequence the terminals of the group connected to said concentrator, and switching means included in each of said concentrators and caused by said computer to render inoperative said scanning means and to operate in turn said computer to dispatch the address of a selected terminal to the common communication means, whereby the selected terminal is connected to said computer for receiving data.

13. A system according to claim 11, further comprising serializer means arranged between the concentrator and the connecting means for transmitting bits of data serially on the common communication means, and parallelizer means arranged between said connecting means and said terminal ready to transmit for parallelizing the bits of said data.

14. A data communication system between a central computer and at least one group of terminals connected to the central computer through a common transmission concentrator and a corresponding line controller, said concentrator and said line controller being operable by the central computer to control a polling procedure for the dispatch of data from the concentrator to the central computer, wherein the improvement comprises:

common communication means included in said conentrator for the communication of data between the terminals of said group and the line controller, connecting means controlled by a terminal of said group ready to transmit for connecting the terminal with the communication means, serializer means arranged between the concentrator and the connection means for transmitting bits of data serially on the common communication means, and parallelizer means arranged between said connection means and said terminal ready to transmit for parallelizing the bits of said data.

* * * * *